March 15, 1955 H. GOLDBERG 2,703,894
NUT TAPPING MACHINE RESPONSIVE TO FEED OF WORK PIECE
Filed Oct. 18, 1949 7 Sheets-Sheet 2

INVENTOR.
Herman Goldberg,
BY
Smith, Olsen & Baird,
Attys.

March 15, 1955 H. GOLDBERG 2,703,894
NUT TAPPING MACHINE RESPONSIVE TO FEED OF WORK PIECE
Filed Oct. 18, 1949 7 Sheets-Sheet 3

Fig. 4.

INVENTOR.
Herman Goldberg,
BY
Smith, Olsen & Baird.
Attys.

March 15, 1955 H. GOLDBERG 2,703,894
NUT TAPPING MACHINE RESPONSIVE TO FEED OF WORK PIECE
Filed Oct. 18, 1949 7 Sheets-Sheet 4

INVENTOR.
BY *Herman Goldberg,*
*Smith, Olsen & Baird,*
Attys.

March 15, 1955　　　H. GOLDBERG　　　2,703,894
NUT TAPPING MACHINE RESPONSIVE TO FEED OF WORK PIECE
Filed Oct. 18, 1949　　　7 Sheets-Sheet 6

Fig. 12.

INVENTOR.
Herman Goldberg,
BY
Smith, Olsen & Baird,
Attys.

United States Patent Office 2,703,894
Patented Mar. 15, 1955

2,703,894
NUT TAPPING MACHINE RESPONSIVE TO FEED OF WORK PIECE

Herman Goldberg, Bartlett, Ill., assignor to Snow Manufacturing Company, Bellwood, Ill., a corporation of Illinois Application October 18, 1949, Serial No. 122,071

9 Claims. (Cl. 10—139)

This invention relates to improvements in nut tapping machines responsive to feed of work piece and the invention may be employed with particular advantage when embodied in the type of machine described and claimed in my prior Letters Patent of the United States No. 2,067,267, dated January 12, 1937, No. 2,249,758, dated January 22, 1941, and No. 2,336,478, dated December 14, 1943.

In nut tapping machines of this type a relative movement is effected between the rotating tap and a device in which the nut blanks are held during the tapping operation and the blanks are caused to move successively to the tapping position as the tapping operation continues. In the operation of such machines, particularly at high speeds, and especially when tapping blanks of small sizes, a problem has arisen because of the difficulty of insuring the proper positioning of the blank when the tap is operating thereon. Because of the presence of metal chips, burrs and dirt from the blanks, or from other causes, the frictional resistance to the movement of the blanks is such that they do not get into the proper tapping position, with the result that the tapped holes are crooked or off center or the tap is broken.

The principal object of the present invention is to overcome the above mentioned difficulty, and others, by providing a nut tapping machine comprising a rotating tap and a work holder in which the blank is fed to tapping position, wherein the movement of the tool to effect a tapping operation cannot take place until the blank to be tapped is accurately in said position. A further object of the invention is to provide a tapping machine of the type referred to in which the axial movement of the tap is automatically controlled by the movement of the nut blank to tapping position. Another object of the invention is to provide a tapping machine comprising a rotatable tapping tool movable axially by compressed air in response to the movement of the nut blank to tapping position in response to compressed air operated means. Still another object is to provide a nut tapping machine comprising a rotatable and axially movable tap in combination with a guide and holder for the nut blank and means for moving the blanks successively to tapping position and means for preventing the axial movement of the tap when there are no blanks in the guide. Another object is to provide nut blank feeding means which may be readily adjusted or altered to accommodate different sizes of nut blanks. Other objects relate to various features of construction and arrangement which will appear more fully hereinafter.

The nature of the invention will be understood from the following specification taken with the accompanying drawings in which one embodiment is illustrated. In the drawings.

As illustrated in the drawings, the invention is embodied in a nut tapping machine comprising a base 20 adapted to rest upon a floor or other support and provided around its upper part with an outwardly extending annular flange forming a tray or table 21. Above the tray or table the base 20 carries a housing 22 which has an inclined upper face 22a on which is mounted a block 23 having a similar inclination and adapted to form a support for the tap operating mechanism and for the mechanism by which the nut blanks are fed to tapping position.

This mechanism carried by the block 23 includes a frame 24 having mounted therein the driving shaft 25 which is adapted to rotate the tap 26 mounted in a chuck 27. The chuck is carried at the end of a spindle which is actuated through reversing mechanism carried in the driving head 28 which is located at the lower end of the frame 24. The axis of the tap 26 is parallel to the inclined upper face of the block 23 and the tap is rotated in a forward or reverse direction depending upon the relative positions of the parts of the friction clutch which is embodied in the reversing mechanism contained in the driving head 28.

The shaft 25 of the driving mechanism for the tap is actuated from an electric motor 30 mounted within the housing 22 and having its shaft connected to a pulley 31 which is connected by a belt 32 with a pulley 33 fixed on the shaft 25. The motor 30 is included in the electric circuit hereinafter described and operates continuously while the tapping machine is in use, the tapping operations being controlled by the movement of the blank to tapping position in response to the automatic control mechanism.

Figure 1:
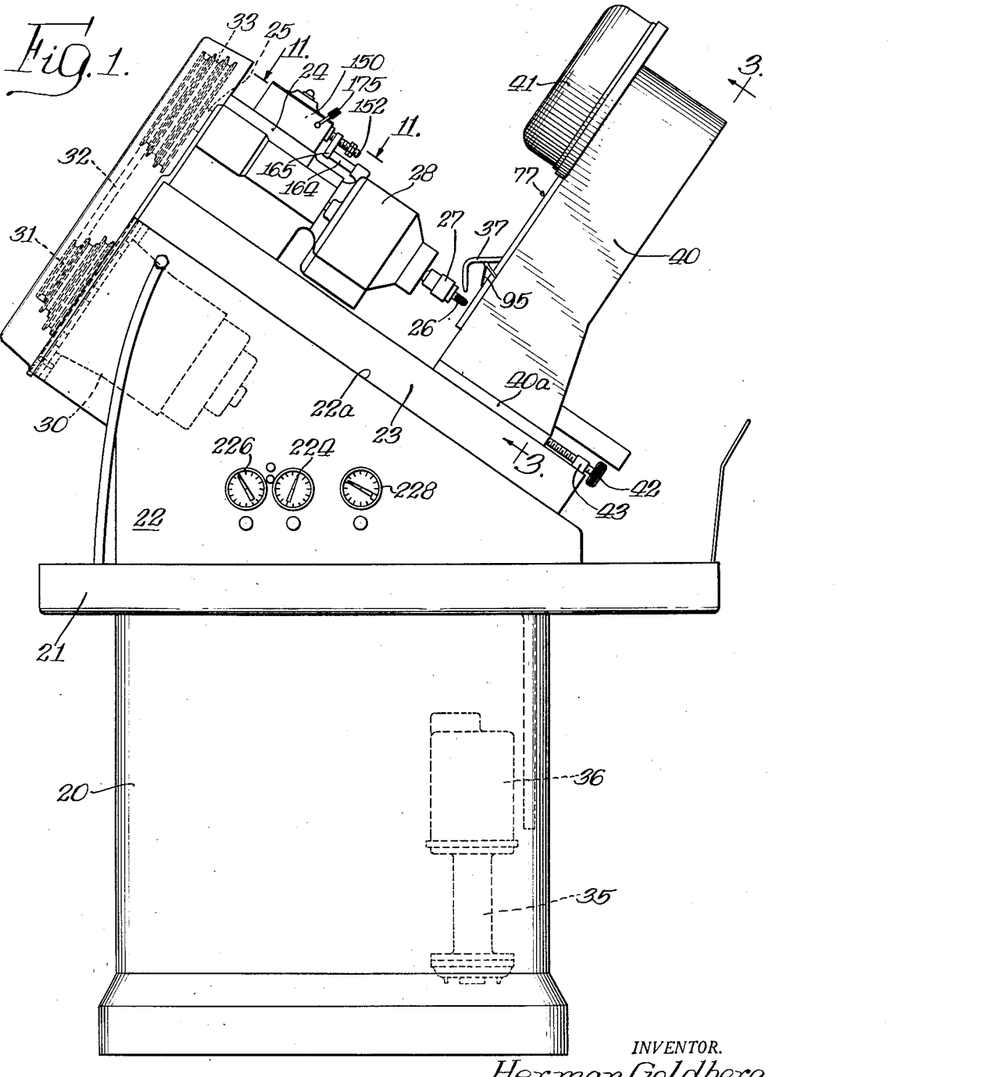
Figure 1 shows a side elevation of a nut tapping machine embodying the features of the present invention.

The lower part of the base 20 contains a reservoir for oil or other lubricant which is adapted to be discharged on the tap 26 during the tapping of the nut blanks and this oil is continuously moved during the operation of the machine by a pump 35 which is driven by a motor 36 and arranged to cause a discharge of the lubricating fluid through a nozzle 37 onto the rotating tap is indicated generally in Fig. 1.

The inclined block 23 also serves as a support for an upwardly inclined hollow frame or standard 40 which carries the nut blank hopper 41. The standard 40 is provided with shoulders 40a along its lateral edges which engage undercut guideways in the block 23 and the standard is capable of adjustment longitudinally of the block by an adjusting screw 42 which threadedly engages a lug 43 carried by the block, thus permitting the adjustment of the position of the nut blanks in the guideway of the feeding mechanism with relation to the normal position of the end of the tap 26.

Figure 4:
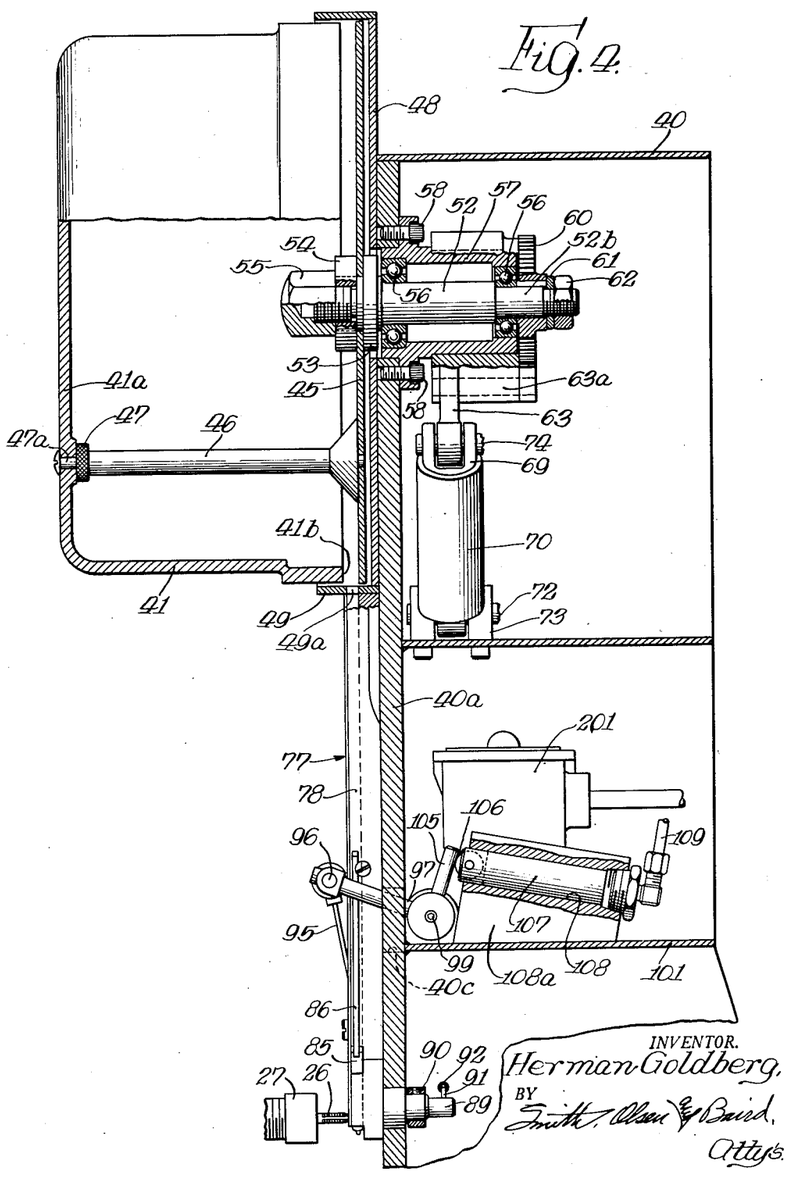
Fig. 4 shows an enlarged sectional view taken on the line 4—4 of Fig. 3.

The nut blank hopper 41 is in the form of a cup-shaped member of circular cross section which has its open end directed toward the wall 40a of the standard or housing 40, as shown particularly in Fig. 4. The hopper 41 comprises an end plate 45 which is secured to the opposite end wall 41a by means of a plurality of rods 46 which are fixed to the plate 45 and which are adjustable with respect to the end wall 41a by means of spacing collars 47 which are recessed to receive the ends of the members 46 which are internally threaded and secured by screws 47a to the wall 41a. By this arrangement, the spaced relation of the plate 45 with respect to the annular edge 41b of the cup-shaped hopper may be regulated in order to vary the size of the opening through which the nut blanks 50 are discharged, thus accommodating the apparatus to the feeding of different sizes of blanks. A circular plate 48 is secured to the wall 40a of the housing or standard 40 and this plate has attached thereto an annular rim or flange 49 which overlaps the edge of the hopper 41 and which is provided at its lower part with an opening 49a through which the nut blanks are adapted to be discharged by the action of gravity.

For the purpose of causing some agitation of the nut blanks in the hopper 41 with a consequent movement of these blanks through the opening 49a, the end plate 45 of the hopper is secured upon a rotatable shaft 52 which is adapted to be actuated to impart an intermittent rotary movement to the hopper. This shaft is provided with an annular flange 53 engaged by one face of the plate 45. A collar 54 engages the other side of the plate 45 and is secured in position to clamp the plate 45 against the flange 53 by means of a nut 55 which engages the threaded extremity of the shaft. The shaft is journaled in ball bearing units 56 which are engaged by annular shoulders formed on the shaft and secured within a tubular bearing member 57 attached to the wall 40a of the housing 40 by means of studs 58.

A ratchet wheel 60 is keyed on the end portion 52b of the shaft and is secured in position thereon by a washer 61 and a nut 62. A lever 63 is provided with a tubular hub portion 63a which is journaled on the outer surface of the bearing member 57 inside of the ratchet wheel 60 and this lever carries a pawl 65 which is adapted to engage the teeth of the ratchet wheel to effect the rotation of the shaft 52 and the consequent angular movement of the hopper 41. The pawl 65 is normally retained in engagement with the teeth of the ratchet wheel by means of a spring 66 extending between a pin fixed in the lever 63 and another pin fixed in the shaft of the pawl. When the lever 63 is moved upwardly, as viewed in Fig. 3, the pawl causes a predetermined angular movement of the shaft 52 and of the hopper. This movement of the lever 63 is effected by means of a piston 69 which is mounted in a cylinder 70 and adapted to be actuated by compressed air admitted to the lower end of the cylinder through a pipe 71. The cylinder 70 is pivoted at 72 on a bracket 73 carried by the housing 40 and the upper end of the piston 69 is pivoted at 74 to the outer end of the lever 63. A coil spring 75 extends between the pivots 72 and 74 and tends normally to retract the piston 69 into the cylinder. Upon the admission of compressed air or the like to the cylinder 70 the piston 69 moves upwardly to cause an actuation of the ratchet wheel which thereby effects an angular movement of the shaft 52 and of the hopper 41 so that the nut blanks 50 are carried around in an angular path and caused to tumble over each other while at the same time the lowermost blanks in the hopper engage the blanks which are located at the opening 49a so that the movement of the blanks tends to supplement the action of gravity in causing some of the blanks to be discharged through the opening into the blank feeding guide 77.

The guide 77 comprises a pair of bars 78 which are secured to the wall 40a of the standard or housing by means of studs 79. The bars 78 are spaced apart to form a channel through which the blanks 50 pass downwardly to the nut tapping position opposite the tap 26.

Figure 2:
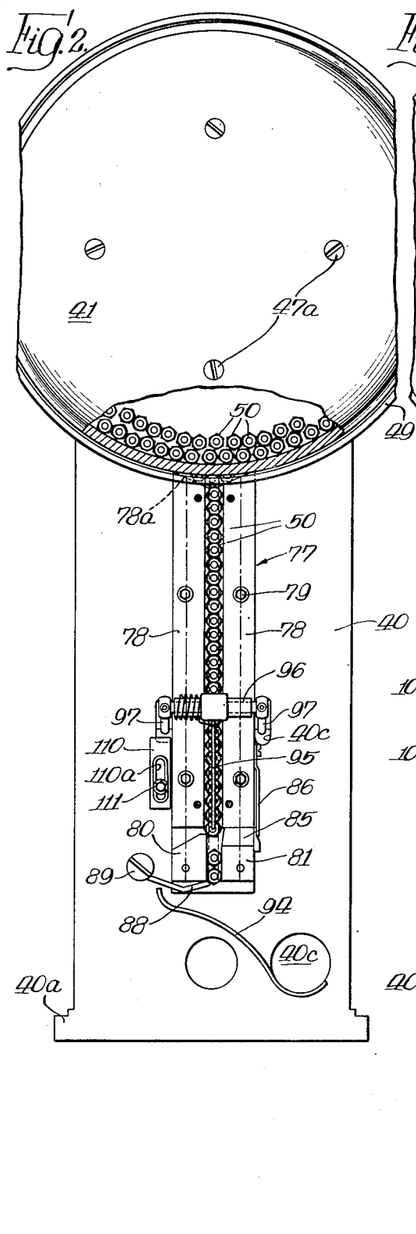
Fig. 2 shows an enlarged elevation of the hopper for the nut blanks and of the feeding means by which the blanks are fed to the tapping position.
Figure 5:
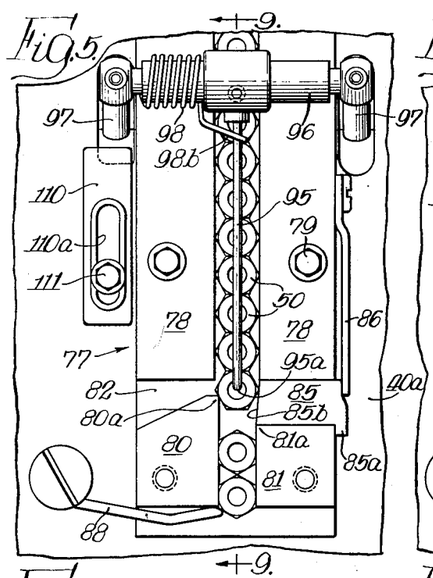
Fig. 5 shows an enlarged elevation of the nut feeding mechanism illustrated in Fig. 2 showing the relative positions of the parts when the nut blank feeding finger is retracted in readiness to effect the advance of a nut blank through the feeding guide.

The upper ends 78a of the bars 78 converge downwardly, as shown in Fig. 2, to direct the blanks into the guide channel. This channel is continued at the lower end of the guideway 77 by two other bars or blocks 80 and 81 which are also secured to the wall 40a of the housing. The bars 78 are spaced apart a distance slightly greater than the distance between two opposite apices of a hexagonal nut, whereas the bars 80 and 81 at the lower end of the guideway are spaced apart a distance only slightly greater than that between two opposite flat faces of the nut. This requires a partial rotation of each nut blank as it passes from the channel between the bars 78 to the channel between the bars 80 and 81 and this is effected in the manner which is illustrated particularly in Figs. 5, 6, 7 and 8. As there shown, the block 80 is spaced slightly from the lower end of the adjacent block 78 to form an opening 82 through which access may be had to the blanks in the guide channel and the upper corner 80a of the block 80 projects beyond the adjacent lower corner of the block 78 above it so that as the nut blank moves downwardly from the channel between the blocks 78, one of the flat faces thereof engages the corner 80a of the block 80 as illustrated in Fig. 5. At the same time, an opposite corner of the nut engages a movable block 85 which is mounted to slide between the block 81 and the bar 78 above it. A leaf spring 86 secured to this bar 78 acts normally to move the block 85 inwardly to the position shown in Fig. 5 where its position is determined by a flange 85a engaging the block 81. The sliding block 85 has an inclined face 85b extending between the lower edge of one bar 78 to the upper left-hand corner 81a of the bar or block 81 and it is this inclined face which is engaged by a corner of the nut blank when the blank reaches the position shown in Fig. 5.

Figure 6:
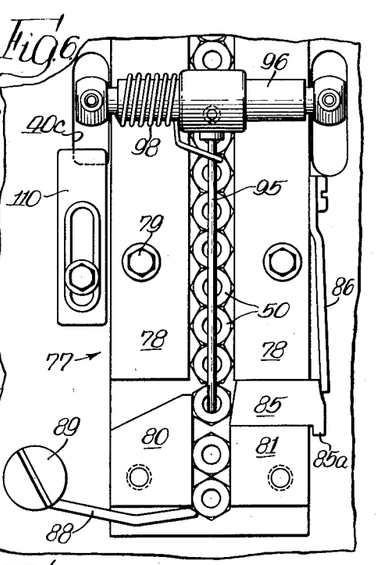
Fig. 6 is an elevation similar to that of Fig. 5 showing the relative positions of the parts of the blank feeding mechanism after the blank engaged by the nut feeding finger has been turned through 45° so that two of its faces are parallel to the walls of the guideway.
Figure 7:
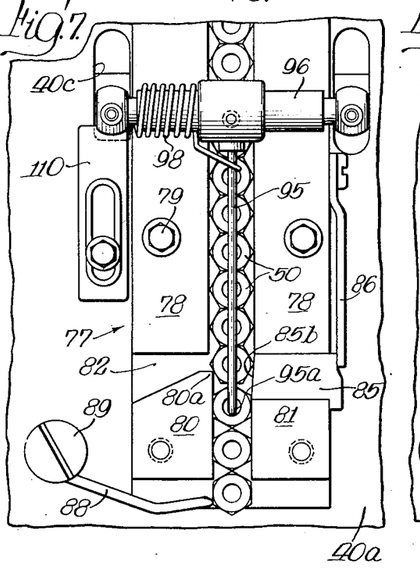
Fig. 7 is a view similar to those of Figs. 5 and 6 illustrating the relative positions of the parts after the nut blankfeeding finger has advanced to a further position wherein the blank ahead of the one engaged by the finger is approaching the tapping position and a tapped nut is being discharged from the guideway.

Further downward movement of the nut blank will cause it to rotate through an angle of 45° while at the same time causing the sliding block 85 to be retracted against the tension of the spring 86, as shown in Fig. 6, so that two flat faces of the nut are then in parallel relationship to the edges of the blocks 80 and 81 and the nut blank may then move downwardly between these blocks to the nut tapping position.

The lowermost nut blank of the series in the guideway 77 is retained against downward movement by a retaining arm 88 which is mounted upon a shaft 89 arranged to rotate in a bearing formed in the wall 40a of the standard or housing. This shaft is secured in position by a collar 90 and has projecting from the inner end thereof a pin 91 which has secured thereto a spring 92. The other end of this spring is attached to the housing and it acts normally to hold the retaining arm 88 in the position shown in Figs. 2, 5 and 6. After a blank has been tapped, the pressure of the next following nuts in the guideway serves to move the retaining arm 88 against the tension of the spring 92 and thus permit the tapped blank to be discharged. Upon discharge, the tap blank falls onto an apron 94 by which it is directed to a discharge opening 40c formed in the wall of the housing or standard.

The means for feeding the nut blanks toward the tapping position is shown particularly in Figs. 2 to 8, inclusive, and comprises a blank feeding finger 95 having a lower inwardly turned extremity 95a which is adapted to enter the aperture of a nut blank. This feeding finger lies in a vertical plane above the nut blanks in the guideway and its upper end is secured to the middle portion of a transverse shaft 96 which has its ends journaled in the enlarged outer extremities of a pair of arms 97. A coil spring 98 is mounted on this shaft with one extremity 98a overlying one of the arms 97 and with the other extremity 98b overlying the feeding finger 95 so that the spring acts normally to force the extremity 95a of the feeding finger into engagement with a nut blank.

Figure 3:
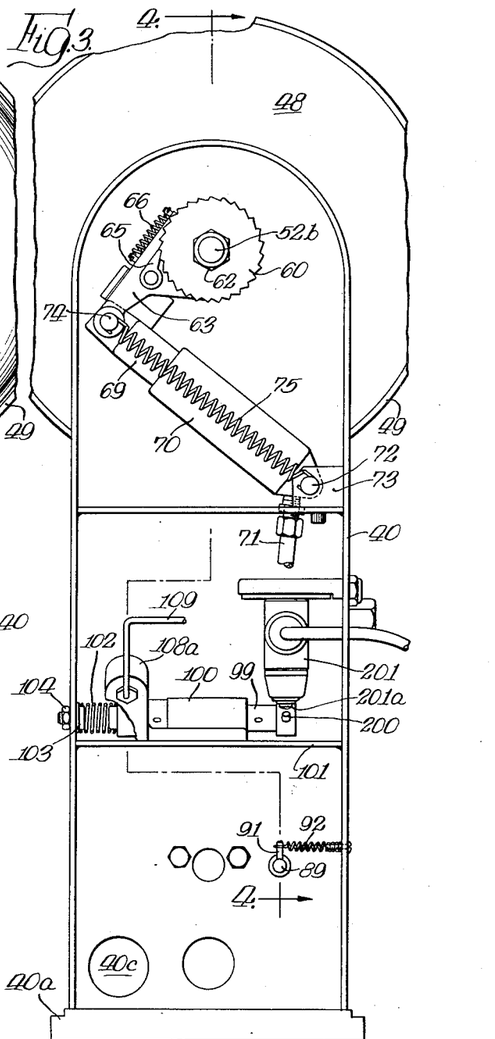
Fig. 3 shows a sectional view taken on the line 3—3 of Fig. 1, illustrating the means for agitating the hopper and other parts of the operating mechanism.

The arms 97 extend through slots 40c which are formed in the wall 40a of the housing 40 and their inner extremities are secured upon a shaft 99 which is journaled in a bearing block 100 carried by a plate 101 secured within the housing 40, as shown particularly in Fig. 3. A coil spring 102 has one end interlocked with one extremity of the shaft 99 and has the other end secured to a bolt 103 which is secured by a nut 104 in the wall of the housing 40 so that the spring acts normally to elevate the arms 97 and thereby lift the feeding finger 95 to its uppermost position.

The feeding movement of the finger 95 is effected by a rotation of the shaft 99 against the tension of the spring 102 which is brought about by the actuation of an arm 105 secured on the shaft 99 and engaged by a roller 106 mounted in the end of a piston 107. This piston is mounted to reciprocate in a cylinder 108 formed in a block 108a fixed on the plate 101 and compressed air is admitted to the cylinder through a pipe 109 to effect the actuation of the piston. When the piston is thus actuated, the shaft 99 is rocked in its bearing and the arms 97 move downwardly in the slots 40c in the wall of the housing and cause the finger 95 to effect the downward movement of a nut blank which is then actuated through the cycles of movement which have been described in connection with Figs. 5, 6, 7 and 8. The extent of the downward movement of the feeding finger may be regulated by a stop member 110 which is secured to the wall 40a of the housing by a stud 111 engaging an elongated slot 110a in the stop member. By this means, the stop member may be secured in any desired adjusted position in order to regulate the feeding movement of the finger 95.

Reference will now be made in greater detail to the mechanism by which the tap 26 is actuated by the motor 30 in order to effect an axial movement of the tap in both directions as well as a reversal in the direction of its rotation. For this purpose, the driving head 28 is mounted to be moved bodily by compressed air longitudinally of the axis of the tap and the head embodies a reversing clutch for controlling the direction of rotation of the tap in response to the change in the direction of the axial movement of the tap. As shown particularly in Figs. 1, 12 and 13, the chuck 27 which carries the tap 26 is mounted upon the end of a spindle 115 which is adapted to be driven through a reversing clutch 116 by a spindle driving shaft 117, the upper end of which has a splined engagement with the hollow driving spindle 25 upon which the belt driven pulley 33 is mounted. The spindle driving shaft 117 is thus free to move longitudinally with respect to the stationary driving spindle 25 in response to axial movements of the head 28 which are brought about at proper times in the sequence of operations of the machine in order to effect the tapping of the nut blanks and the withdrawal of the tap therefrom.

In order to permit a movement of the tapping head 28 bodily in a direction axially of the tap, this head is provided with a cylindrical extension 119 which is journaled in a bearing 120 formed in the cylinder block 24. The movement of the tapping head 28 is effected by means of pistons 121 which are mounted in cylinders 122 formed in the cylinder block. These pistons 121 are connected by piston rods 123 to the crosshead 124 of the tapping head 28 and the intermediate parts of these piston rods slide in bearings 125 which are provided in the lower end of the cylinders 122 to form substantially fluid tight connections therewith.

Figure 12:
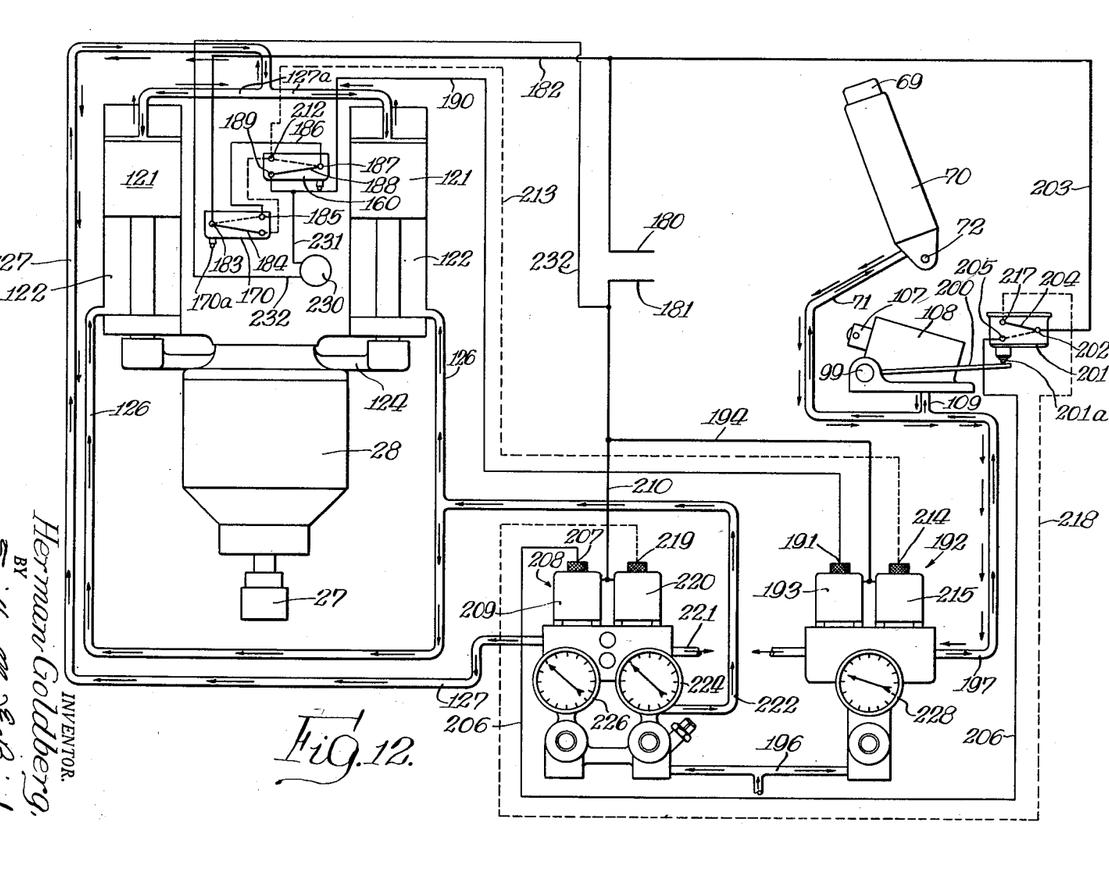
Fig. 12 is a somewhat diagrammatic view showing the means for actauting the tap to move it through forward and reverse strokes and also portions of the pneumatic system and of the electric circuit by which the operations of the machine are controlled.
Figure 13:
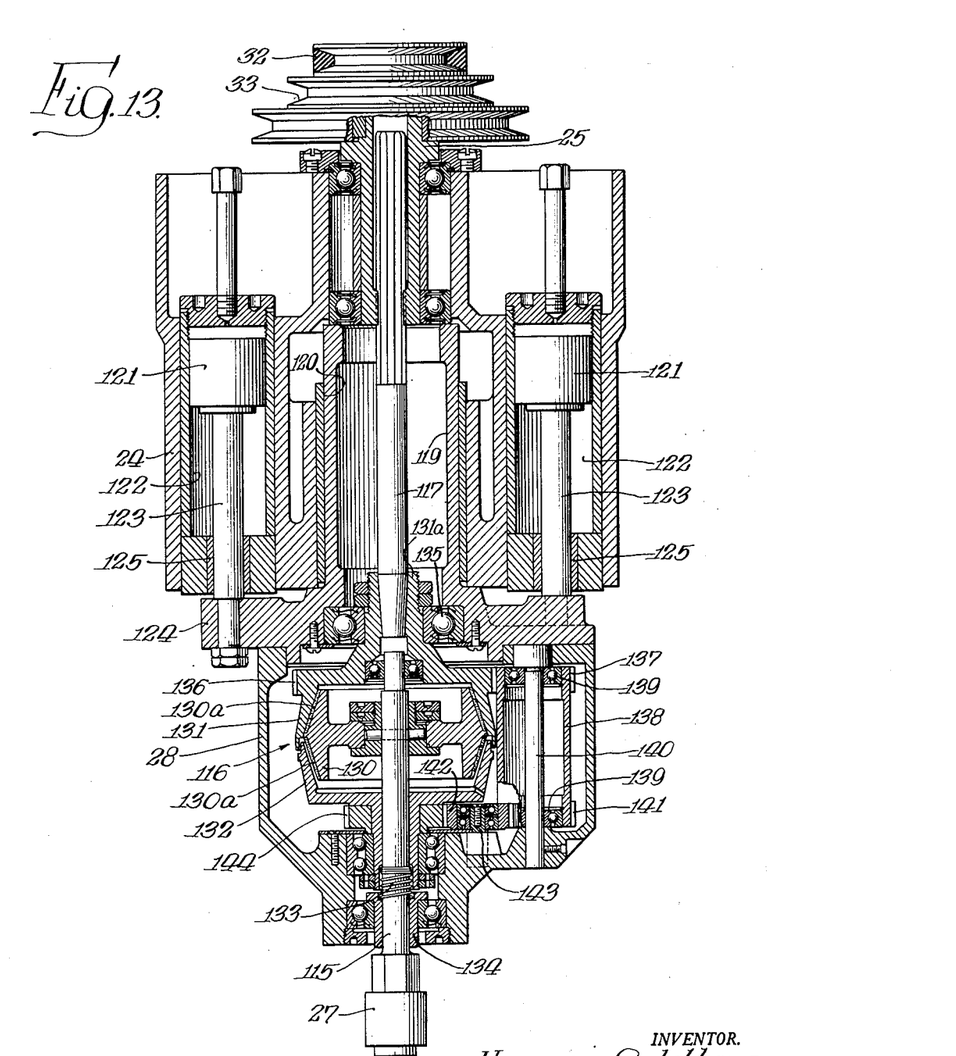
Fig. 13 shows a sectional view through the tapping head, illustrating the mechanism by which the direction of rotation of the tap is automatically reversed.

As shown particularly in Fig. 12, compressed air is admitted to the lower ends of the cylinders 122 through pipes 126. This air pressure is constantly applied to the lower ends of the cylinders at a relatively low pressure and serves normally to maintain the pistons 121 in their uppermost positions with the tapping head 28 in its retracted position shown in Figs. 12 and 13. When a tapping operation is performed, compressed air at a higher pressure is admitted to the upper ends of the cylinders 122 through pipes 127 and the branch pipes 127a and this pressure overcomes the lower pressure applied to the undersides of the pistons 121 so that these pistons then move through forward strokes and cause an axial movement of the tap 26 to and through the nut blank which is then in tapping position. The admission of compressed air to the upper ends of the cylinders 122 is automatically controlled as hereinafter described.

In order that the tap 26 may be rotated in a tapping direction when it is being moved axially toward and through the nut blank, and in a reverse direction when it is being retracted after the completion of the tapping operation, the reversing clutch 116 is arranged to operate automatically depending upon the character of the end thrust exerted upon the tap. For this purpose, a clutch member 130 in the form of a double truncated cone and having annular surfaces 130a formed of cork or other frictional material, is secured upon the tap spindle 115 and is arranged to be engaged on its peripheral surface either by a clutch member 131 secured upon the spindle shaft 117 or by a clutch member 132 which is secured upon the tap spindle 115. The intermediate clutch member 130 is normally held in a neutral position, where it does not engage either of the clutch members 131 or 132, by the action of a coil spring 133 which is mounted around the spindle 115 with one end engaging the bushing 134 in which the spindle is journaled and with the other end engaging a ring secured to the spindle.

The upper clutch member 131 serves as a driving shell for driving the tap spindle 115 and the tap 26 in a tapping direction and it is provided with a tubular extension 131a which is journaled in a ball bearing unit 135 secured in the crosshead 124 of the tapping head 28. The clutch member or driving shell 131 is also provided with an annular gear 136 arranged to mesh with another gear 137 carried by a cylinder 138 which revolves in ball bearing units 139 carried by a countershaft 140 secured in a lateral extension of the driving head. Another gear 141 is carried by the cylinder 138 and meshes with an intermediate pinion 142 mounted to rotate on a stub shaft 143. This pinion meshes with a gear 144 which is secured to the reverse driving shell 132 so that when the clutch member 130 is moved into engagement with the member 132 the spindle shaft 115 and the tap are rotated in a direction which is opposite to that in which they are rotated when the clutch member 130 is actuated by the member 131 and at twice the speed.

Thus, when the compressed air is admitted to the upper ends of the cylinders 122 to effect the downward movement of the crosshead 124 and of the tapping head 28, the engagement of the end of the tap with the blank to be tapped will cause an axial movement of the tap spindle 115 sufficient to bring the clutch member 130 into engagement with the driving shell 131 so that the tap will be rotated in a tapping direction as the downward axial movement of the tap continues under the influence of the compressed air admitted to the upper ends of the cylinders 122. At the completion of the tapping operation the supply of compressed air is cut off from the upper ends of the cylinders 122, whereupon the pistons 121 and the tapping head 28 move upwardly under the influence of the constantly applied low pressure air operating on the lower faces of the pistons. The engagement of the threads of the tap with the threads of the tap nut then cause an axial movement of the tap spindle 115 which causes the clutch member 130 to engage the lower reverse driving shell 132 so that the tap is then rotated in a reverse direction and is unscrewed from the tapped nut while the tapping head 28 and the pistons 121 are being withdrawn by the action of the low pressure air admitted to the lower ends of the cylinders 122.

Figure 11:
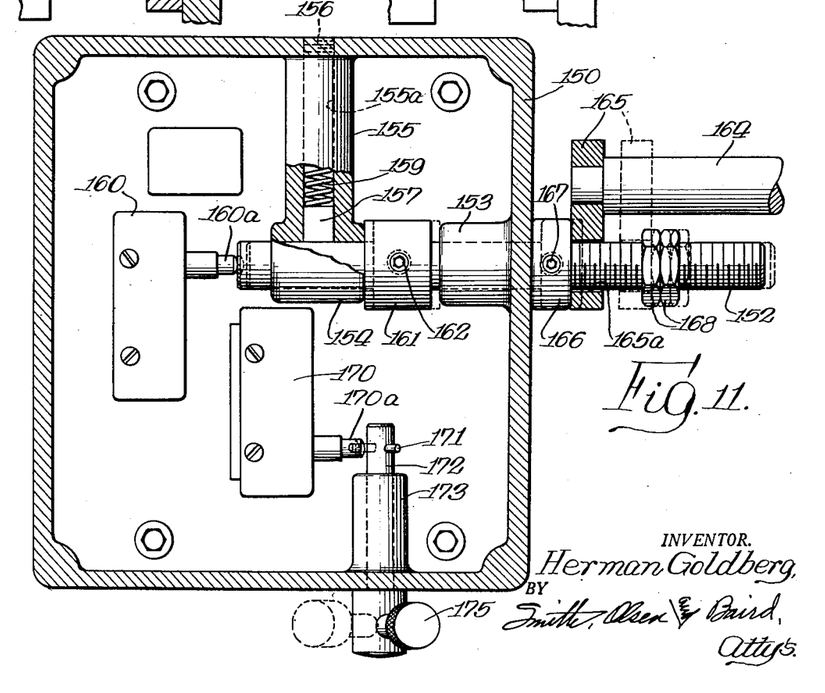
Fig. 11 is an enlarged sectional view taken on the line 11—11 of Fig. 1.

As shown in Figs. 1 and 11, there is mounted on top of the cylinder block 24 a switch housing 150 in which is located a switch 160 adapted to be actuated in response to the axial movements of the tool through an actuating member 152 which is slidably mounted in a bearing 153 carried by the wall of the housing and in another bearing 154 formed in the inner end of an arm 155 which extends inwardly from a side wall of the housing. The arm 155 has a cylindrical bore 155a closed at its outer end by a threaded plug 156 and having mounted therein a block 157 which is pressed by a spring 159 against the surface of the member 152 to provide frictional resistance to the endwise movement of that member.

The upper end of the rod 152, as viewed in Fig. 1, is adapted to engage and actuate the operating member 160a of the switch 160 which controls the actuation of the pistons in the cylinders 70 and 108 by which the hopper and the feeding finger, respectively, are operated. The upward movement of the member 152 is limited by the engagement with the bearing member 154 of a sleeve 161 secured on the member 152 by a set screw 162. The movement of the member 152 in the other direction is limited by the engagement of the sleeve 161 with the end of the bearing member 153.

The actuating member 152 is operated by a rod 164 which is fixed in the crosshead 124 of the tapping head 28 and which carries a transverse arm 165 having an aperture 165a engaged by the actuating member. A collar 166 is secured to the member 152 by a set screw 167 and when the rod 164 moves upwardly in response to the upward movement of the tapping head, the arm 165 engages this collar and moves the member 152 upwardly to actuate the switch 160. When the rod 164 moves in the opposite direction the actuating member is moved downwardly, or toward the right as viewed in Fig. 1, by the engagement of the arm 165 with one of the nuts 168 which are mounted on the lower threaded portion of the actuating member 152, thereby allowing the switch 160 to open.

Within the housing 150 there is also located a manually operated starting switch 170 connected in the circuit hereinafter described and having an operating member 170a adapted to be actuated by a pin 171 on an operating shaft 172 journaled in a boss 173 formed on the wall of the housing. This shaft is provided outside of the housing with an operating handle 175.

As illustrated somewhat diagrammatically in Fig. 12, two line conductors 180 and 181 are connected to the terminals of a 110-volt circuit and the conductor 180 is connected by a conductor 182 to one terminal 183 of the manual starting switch 170. When this switch is actuated by operating the handle 175, a connection is established through the movable switch arm 184 to the terminal 185 from which a conductor 186 leads to the terminal 187 of the switch 160. Assuming that the actuating rod 152 (see Fig. 11) has been moved to its upper position by the low pressure air acting on the lower faces of the pistons 121, the movable switch arm 188 will have been caused by the actuating member 160a to establish a connection between the terminal 187 and the terminal 189 from which a conductor 190 leads to the intake terminal 191 of the solenoid operated valve 192 by which the flow of compressed air to the hopper agitating cylinder 70 and to the blank feeding cylinder 108 is controlled.

The solenoid operated valve 192 may be of any suitable construction such as that shown in United States Letters Patent No. 2,472,968, dated June 14, 1949, and it comprises a solenoid 193 which has one end of its winding connected to the terminal 191 and the other end to a conductor 194 which leads to the other line conductor 181. When the solenoid 193 is thus energized, it actuates a needle valve which opens to permit the flow of compressed air from a supply conduit 196, connected to an air compressor or the like, to the conduit 197 which extends through one branch 71 to the hopper agitating cylinder 70 and through another branch 109 to the cylinder 108 which actuates the nut blank feeding finger 95. When these air connections are thus established the piston 69 in the cylinder 79 operates the pawl 65 to effect a partial rotation of the ratchet wheel 60, thereby agitating the nut blanks in the hopper and facilitating their movement into the guideway 77. At the same time the piston 107 in the cylinder 108 is actuated to rotate the shaft 99 and thereby cause a feeding movement of the finger 95 as heretofore described.

As the feeding finger 95 reaches the limit of its feeding movement, an arm 200 projecting from the shaft 99 (see Figs. 3, 10 and 12) engages the actuating member 201a of a switch 201 which has a terminal 202 connected by a conductor 203 to the line conductor 180. When the switch 201 is actuated by the arm 200 the terminal 202 is connected by the movable switch arm 204 to the switch terminal 205 which is connected by a conductor 206 to the intake terminal 207 of a solenoid operated valve 208. The intake solenoid 209 is connected at one end to the terminal 207 and at the other end to a conductor 210 leading to the other line conductor 181 so that the solenoid is thus energized and operates a needle valve to establish a communication between the air supply line 196 and the conduit 127 which is connected to the upper ends of the cylinders 122 through the branch conduits 127a. The pistons 121 are thus actuated to cause an axial feeding movement of the tap 26. As the tap engages the nut blank which is located in the tapping position the clutch member 130 is moved into engagement with the driving shell 131 and the tap is thereby rotated to tap the blank as its axial movement continues.

When the tap has completely tapped the blank the arm 165 on the rod 164 fixed in the crosshead 124 engages the uppermost nut 168 and causes a longitudinal movement of the actuating member 152 thereby releasing the switch actuating member and permitting the movable switch arm 188 to restore to its original position wherein it connects the terminal 187 to a terminal 212. This operation establishes a circuit from the terminal 212 through a conductor 213 to the exhaust terminal 214 of the solenoid operated valve 192, thereby energizing an exhaust solenoid 215 which is connected by the previously mentioned conductor 194 to the supply line 181. When the exhaust solenoid 215 is energized a valve is opened to connect the conduit 197 to the atmosphere so that the air is then exhausted from the cylinders 70 and 108 and the pistons 69 and 107 are permitted to restore to their original positions.

When the air is exhausted from the feeding cylinder 108 the arm 200 moves back to its normal position, thus releasing the actuating member 201a and permitting the switch arm 204 to restore to its original position wherein it connects the terminal 202 to a terminal 217 which is connected by a conductor 218 to the exhaust terminal 219 of the solenoid operated valve 208. This energizes the exhaust solenoid 220 which operates a valve to connect the conduit 127 to the conduit 221 so that the air above the pistons 121 is exhausted to the atmosphere, thereby permitting the pistons to restore to their upper positions by the action of the low pressure air which is constantly applied to the lower faces of the pistons through the conduits 126 which are connected by a conduit 222 and a pressure regulator to the supply conduit 196. The pressure of the air supplied to the conduit 222 is indicated by a gauge 224 and the pressure of the air supplied to the conduit 127, which is also determined by a pressure regulator, is indicated by a gauge 226. Similarly, the pressure of the air admitted to the conduit 197 is governed by a pressure regulator and is indicated by a gauge 228.

Figure 8:
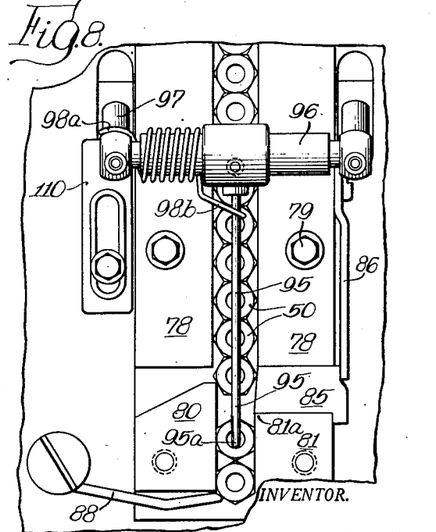
Fig. 8 is an elevation similar to those of Figs. 5, 6 and 7, illustrating the relative positions of the parts after the blank engaged by the finger has reached its final position and has pushed the next preceding blank to the tapping position.
Figures 9, 10:
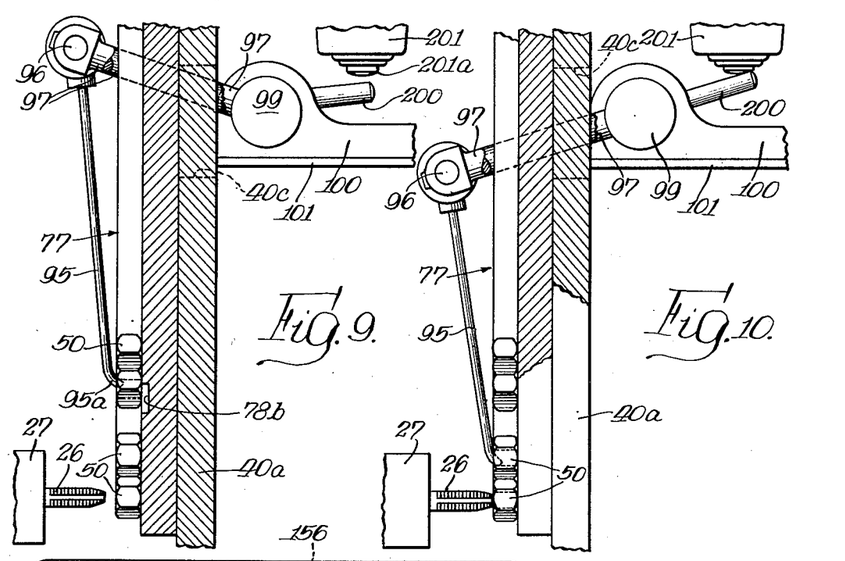
Fig. 9 shows an enlarged sectional view on the line 9—9 of Fig. 5, illustrating the nut blank feeding finger engaging a blank preliminary to starting the feeding operation.
Fig. 10 is a sectional view similar to that of Fig. 9 showing the position of the nut feeding finger and the blank engaged thereby at the end of the feeding operation, the next preceding blank in the guideway being in the tapping position.

As soon as the parts are restored to their initial positions in the manner just described a new cycle of operations is started because the switch 160 is then again operated by the actuating member 152. An important feature of each cycle is that the actuation of the tapping head to move the tap toward the nut blank in the guide channel does not take place until the feeding finger has reached the limit of its feeding movement, as shown in Figs. 8 and 10, at which time the nut blank next below that engaged by the feeding finger is in the tapping position. Since the tap is actuated only in response to the movement of a nut blank to the tapping position, the accurate tapping of the blanks without breakage of taps is assured. At the end of the desired work period the machine is stopped by restoring the starting switch 170 to its initial position whereupon the motor 30 may be stopped by opening its circuit.

In order to prevent the actuation of the tap when there are no nut blanks in the guide channel 77, the bottom of the channel is provided with a recess 78b, shown in Fig. 9, which will arrest the movement of the feeding finger 95 since the inturned extremity 95a thereof will be moved into engagement with this recess by the spring 98. The movement of the feeding finger 95 is thus arrested before the arm 200 can actuate the switch 201 so that air is not admitted to the cylinders 122 and no axial movement of the tap takes place.

An indicator lamp 230 is connected by a conductor 231 to the conductor 190 and by another conductor 232 to the line conductor 181 so that it will be lighted as soon as the tap head starts its forward stroke and will continue to be lighted until the reverse stroke is started. There is therefore a continuous flicker of the light during a normal series of forward and reverse strokes. If the machine stops before completing a forward stroke the lamp 230 will remain lighted and this condition will also exist if the supply of blanks is exhausted or interrupted and the feeding finger 95 engages the recess 78b in the blank feeding guide to stop the machine.

Although one form of the invention has been shown and described by way of illustration, it will be understood that the invention may have various other embodiments which come within the scope of the appended claims.

I claim:

1. The combination in a machine of the class described, of a hopper for work blanks, a guide channel adapted to receive a series of said blanks from said hopper, a stationary work holder, means engageable with a blank in said channel and moved longitudinally with respect to said channel for moving said blanks until one of said blanks reaches an operating position in said work holder, a rotatable tool, means for rotating said tool, means actuated in response to movement of said first-mentioned means when a work blank reaches said operating position for moving said tool axially into engagement with that work blank, means actuated when the tool has completed its operation on that blank for causing a restoring reverse operation of said first mentioned means, and means actuated in response to restoration of said first mentioned means for reversing the direction of rotation of said tool and withdrawing said tool for that work blank.

2. The combination in a machine of the class described, of a hopper for work blanks, a guide channel adapted to receive a series of said blanks from said hopper, means engageable with a blank in said channel for moving said blanks until one of said blanks reaches an operating position, a rotatable tool, means for rotating said tool, means actuated in response to movement of said first-mentioned means to a predetermined position wherein a work blank will be disposed in said operating position for moving said tool axially into engagement with that work blank, and stationary stop means engaged by said first-mentioned means for preventing said movement of said first means to said predetermined position when there are no work blanks in said guide channel.

3. The combination in a machine of the class described, of a guide channel adapted to receive a row of work blanks, means for supplying blanks to said channel, a work feeding finger adapted to engage a work blank disposed between other work-blanks in said row in said channel, compressed air operated means for moving said finger, said finger being so constructed and arranged that movement thereof by said last-mentioned means will advance said blanks in said channel and cause one of said blanks to reach an operating position, a rotatable tool, means for rotating said tool, compressed air operated means actuated when a blank reaches said position for moving said tool axially into engagement with that blank, and stationary stop means for engaging said finger and preventing the operation of said tool moving means when there are no blanks in said channel.

4. The combination in a machine of the class described, of a stationary work holding guideway for containing a plurality of work blanks, means for supplying work blanks to said guideway, means positively engaging at least one of said blanks in said guideway for moving said blanks in longitudinal direction along said guideway to a working position therein wherein one of said blanks is held by said guideway against rotation, a rotatable tool, means for rotating said tool, and means including an electric circuit and a switch actuated by movement of said blank engaging and moving means only when a blank reaches said position for causing said tool to move axially into engagement with that blank.

5. The combination in a machine of the class described, of a work holder, means for supplying work blanks to said holder, means for moving said blanks in said holder to a working position, a rotatable tool, means for rotating said tool, means including an electric circuit and a switch actuated by said blank moving means when a blank reaches said position for causing said tool to move axially into engagement with that blank, means actuated when the tool has completed its operation on that blank for causing a reverse operation of said blank moving means to restore said switch, and means actuated upon restoration of said switch for reversing the direction of rotation of said tool and withdrawing the same from the work.

6. The combination in a machine of the class described, of a hopper for work blanks, a work holder adapted to receive blanks from said hopper, fluid pressure operated means for moving said hopper to agitate the blanks therein, fluid pressure operated means for moving blanks in said holder to a working position, a rotatable tool, means for rotating said tool, means including an electric circuit and a switch operated by said blank moving means when a blank reaches said position for causing said tool to move axially into engagement with that blank, means actuated when the tool has completed its operation on that blank for causing a reverse operation of said blank moving means and of said hopper moving means to restore said switch, and means actuated upon restoration of said switch for reversing the direction of rotation of said tool and withdrawing the same from the work.

7. The combination in a machine of the class described, of a guide channel adapted to receive a series of work pieces, movable work feeding means adapted to engage a work piece in said channel, said feeding means being so constructed and arranged that movement thereof from a first position to a second position will advance one of said work pieces to an operating station, a tool, tool advancing means actuated in response to movement of said feeding means to said second position for moving said tool into engagement with the work piece at said operating station, and an immovable obstruction engaged by said work feeding means in the absence of work pieces in said channel, said obstruction being so constructed and arranged as physically to obstruct and prevent movement of said feeding means to said second position, and thus prevent said actuation of said tool advancing means, when there are no work pieces in said channel.

8. The combination in a machine of the class described, of a guide channel adapted to receive a series of work pieces, movable work feeding means including a finger adapted to engage a work piece in said channel, said work feeding means being so constructed and arranged that predetermined movement thereof will advance said finger in said channel from a first position to a second position and move one of said work pieces to an operating station, a tool, tool advancing means actuated in response to said predetermined movement of said feeding means for moving said tool into engagement with the work piece at said operating station, and an obstruction in said channel engaged by said finger in the absence of work pieces in said channel, said obstruction being so constructed and arranged as physically to prevent advancement of said finger to said second position, and thereby prevent said predetermined movement of said feeding means and said actuation of said tool advancing means when there are no work pieces in said channel.

9. The combination in a machine of the class described, of a guide channel adapted to receive a series of apertured work pieces, movable work feeding means including a finger movable longitudinally of said channel and having an extremity adapted to engage an aperture of a work piece in said channel, resilient means urging said extremity into said aperture and into said channel, said work feeding means and said finger thereof being so constructed and arranged that predetermined movement of said feeding means will advance one of said work pieces to an operating station, a tool, tool advancing means actuated in response to said predetermined movement of said feeding means for moving said tool into engagement with the work piece at said operating station, and an obstruction exposed in said channel and engaged by said extremity of said finger in the absence of work pieces in said channel, said finger and said obstruction being so constructed and arranged that engagement of the finger with said obstruction will prevent said predetermined movement of said feeding means and thus prevent the actuation of said tool advancing means when there are no work pieces in said channel.

References Cited in the file of this patent

UNITED STATES PATENTS

| Number | Name | Date |
|---|---|---|
| 828,682 | Rodd | Aug. 14, 1906 |
| 1,219,803 | Brightman | Mar. 20, 1917 |
| 1,444,110 | Clay | Feb. 6, 1923 |
| 1,570,156 | Kingsbury | Jan. 19, 1926 |
| 1,656,758 | Saylor | Jan. 17, 1928 |
| 1,846,645 | Lach | Feb. 23, 1932 |
| 1,859,026 | Crosby | May 17, 1932 |
| 1,891,721 | Mercadante et al. | Dec. 20, 1932 |
| 2,152,591 | Hanneman | Mar. 28, 1939 |
| 2,249,758 | Goldberg | July 22, 1941 |
| 2,266,864 | Hausknecht | Dec. 23, 1941 |
| 2,266,933 | Williams | Dec. 23, 1941 |
| 2,271,717 | Schwartz | Feb. 3, 1942 |
| 2,336,478 | Goldberg | Dec. 14, 1943 |
| 2,356,087 | Prokul | Aug. 15, 1944 |
| 2,408,457 | Tripp | Oct. 1, 1946 |
| 2,472,968 | Goldberg | June 14, 1949 |
| 2,580,187 | Nichols et al. | Dec. 25, 1951 |